Oct. 13, 1925.  
J. H. ORDWAY  
1,556,874  
CLUTCH MECHANISM  
Filed Jan. 25, 1923   3 Sheets-Sheet 1
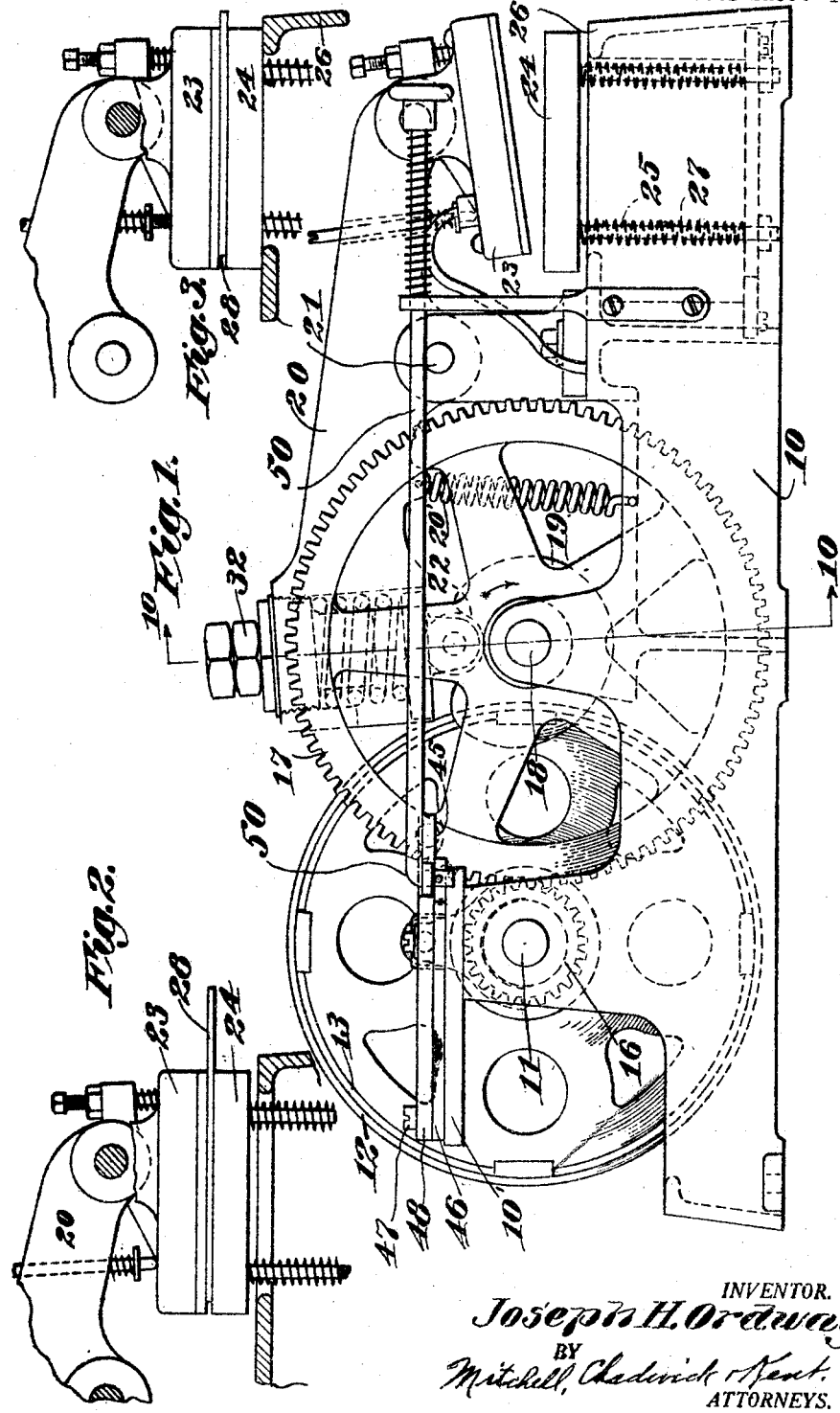
INVENTOR.  
Joseph H. Ordway  
BY Mitchell, Chadwick & Kent  
ATTORNEYS.

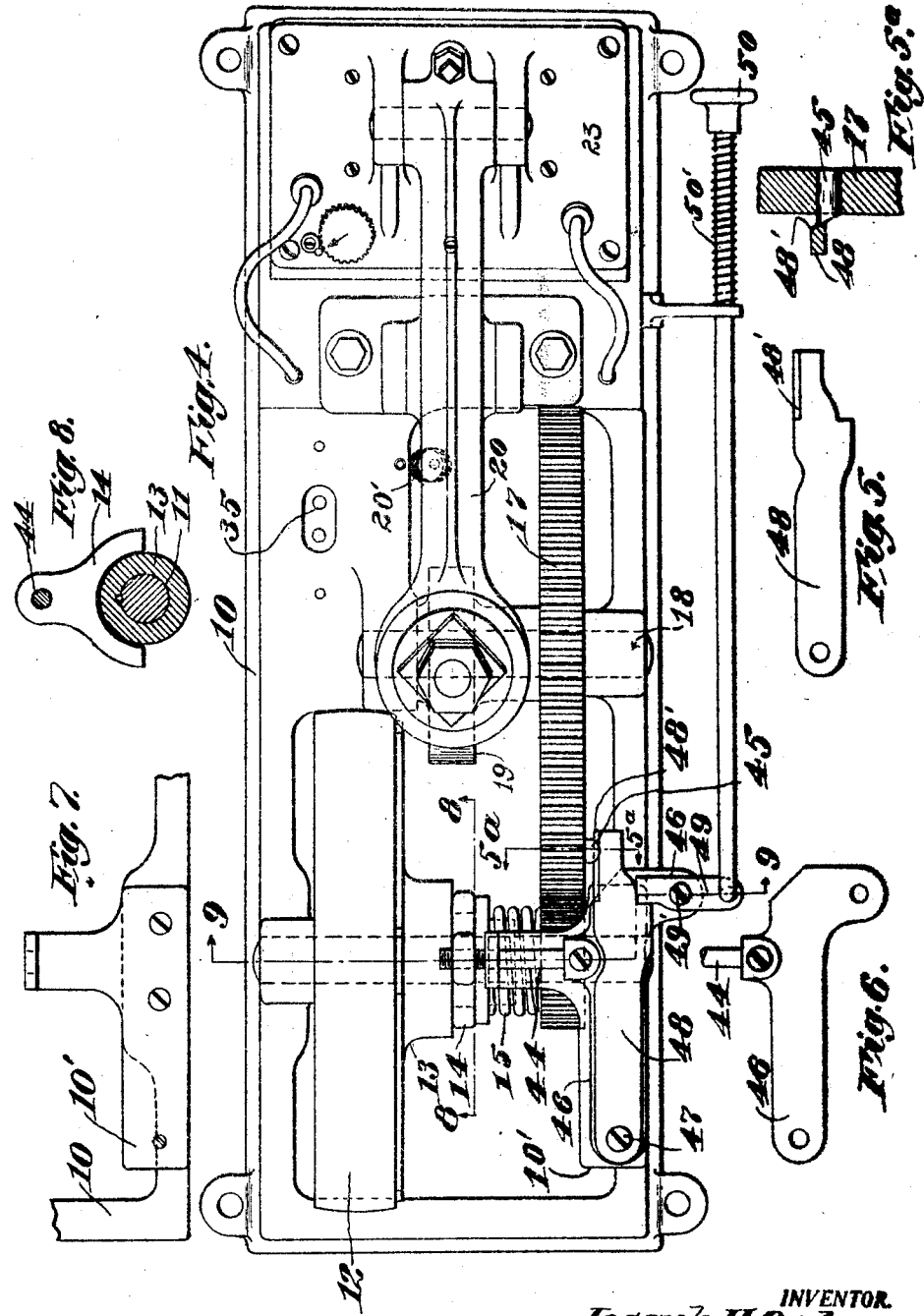

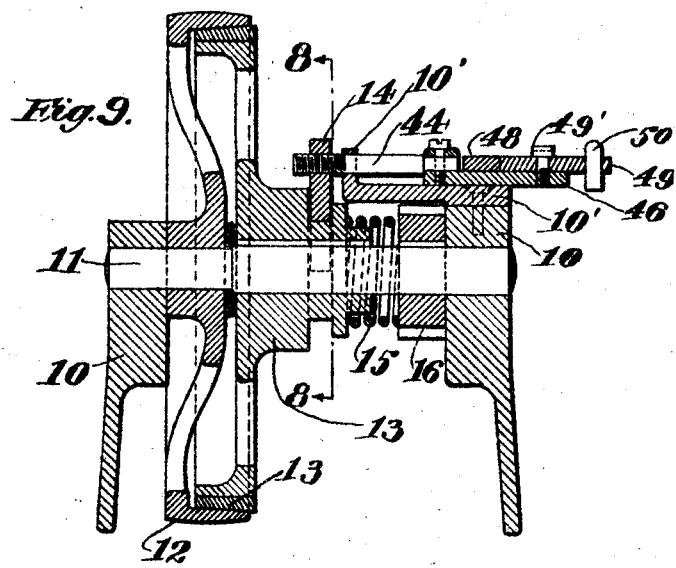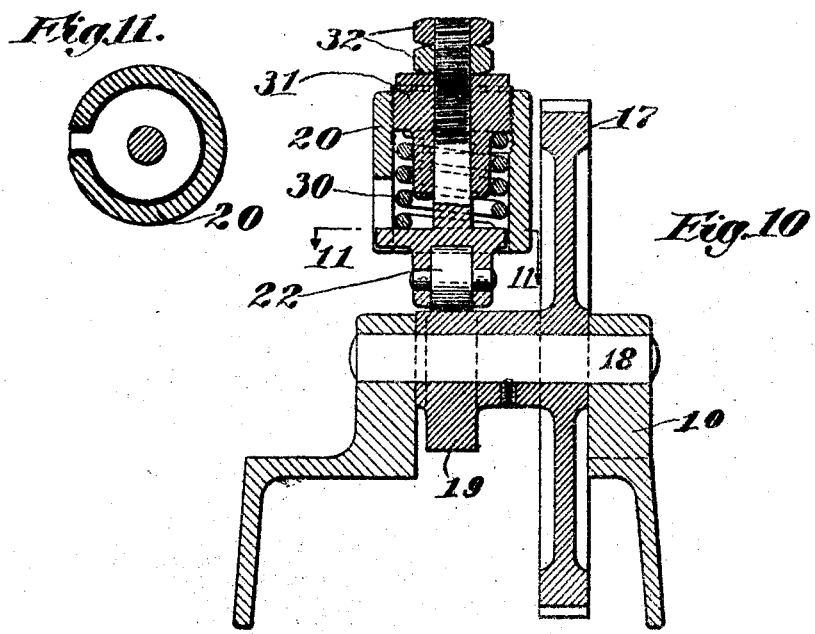

Patented Oct. 13, 1925.

1,556,874

UNITED STATES PATENT OFFICE.

JOSEPH H. ORDWAY, OF BROOKLINE, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

CLUTCH MECHANISM.

Original application filed April 12, 1920, Serial No. 373,036. Divided and this application filed January 25, 1923. Serial No. 615,447.

*To all whom it may concern:*

Be it known that I, JOSEPH H. ORDWAY, a citizen of the United States, residing at Brookline, in the county of Norfolk and State of Massachusetts, have invented certain new and useful Improvements in Clutch Mechanisms, of which the following is a specification.

This invention relates to improvements in clutch mechanisms. More particularly it relates to semi-automatic clutch mechanisms adapted for use in connection with machines which are repeatedly to be started, driven and stopped for carrying out predetermined operations, the starting being at the will of an attendant person, and the execution and stopping being automatic.

To this end the invention provides a clutch which tends to close, in order to start and maintain the principal mechanism in operation; provides the principal mechanism with a device which, at a pre-determined point in its cycle, exerts the power of the machine through suitable connections to open the clutch; provides means for the operator to break said connections, letting the clutch close; and provides other means which automatically re-establish the connections as soon as the machine starts, so that when the same point in the cycle is again reached the machine again stops itself.

This application for patent is a division of my copending application, Serial 373,036, filed April 12, 1920, for patent on an improvement in molding presses and the invention is herein described and illustrated as it may be applied to a press for manipulating plastic sheets, such as box toe stiffeners used in shoes. The press, however, is to be considered merely typical of any machine which is to be started by an operator and whose stopping is to be effected by mechanical means automatically under predetermined conditions.

The mechanism illustrated employs a clutch, one member of which is a driving pulley continuously rotating, and the other member of which is removable toward the first, by a compression spring, to make driving connection, and is retractable therefrom by a clutch lever to break the said connection.

The distinctive features of the invention are applied to the control of this clutch lever. For its control there is a second or auxiliary lever for moving the clutch lever in a direction to throw the clutch open; there is a device latching together these two levers so that when they are thus latched a force applied to the second lever will act through the latch to open the clutch; there is a moving part of the driven apparatus, which at a predetermined part of the cycle engages the second lever in order thus to open the clutch; and there is manual releasing means by which the operator, when ready for the machine to start, may release the said latch. Thereupon the first or clutch lever, being free from its connection with the second lever, and thus free from the automatic control, has no power to resist the clutch-closing spring, which thereupon closes the clutch so that the machine starts. But the latch is so arranged as to engage itself again, between the two levers, automatically, upon the starting of the machine and the cessation of the operator's touch. This puts the clutch lever again under control of the second lever, which control is exercised when the driven apparatus again completes its prescribed travel, so that the clutch is again thrown open. By providing or choosing a suitably rotating part as the carrier of the cam pin it can be made to arrive at clutch operating position at any desired point in the progress of the cycle of operations in which the principal machine is engaged or at the completion of one or more cycles.

The invention can be embodied in various forms. It is intended that the patent shall cover, by suitable expression in the appended claims, whatever features of patentable novelty exist in the invention disclosed.

In the accompanying drawings:

Figure 1 is a side elevation of a complete machine embodying the invention showing the pressing plates in position for insertion or removal of the material while the clutch is disengaged;

Figures 2 and 3 are similar elevations of a fragment, showing successive stages of operation, while the clutch is engaged;

Figure 4 is a plan of the machine;

Figure 5 is a plan of an auxiliary lever of the clutch mechanism;

Figure 5ª is an elevation in section on line 5ª—5ª of Figure 4;

Figures 6 and 7 are plans of details of the clutch mechanism which underlie each other in Figure 4;

Figure 8 is a side elevation of a detail, in section on the line 8—8 of Figure 4;

Figure 9 is a rear end elevation of parts, in section on the line 9—9 of Figure 4;

Figure 10 is a rear end elevation of parts, in section on the line 10—10 of Figure 1; and Figure 11 is a plan of a detail, in section on the line 11—11 of Figure 10.

Referring to the drawings, 10 indicates a base wherein is journaled a shaft 11 which, as most clearly seen in Figures 4 and 9, supports loosely a driving wheel 12 whose interior face constitutes one member of a clutch, the other member of the clutch being marked 13, splined on shaft 11 and slidable thereon by fork 14 working against spring 15. When the clutch is set closed, the shaft 11 is thereby driven, and with it the pinion 16 thereon which, as seen in Figures 1 and 4, drives a larger gear 17 set in the middle portion of the machine on a shaft 18 which also carries a cam 19 for operating the lever 20. Said lever, fulcrumed further forward in the machine at 21, has at its rear a roller 22 riding on top of the cam, so that the rises in the cam cause depression of the forward end of the lever 20, forcing the upper presser block or plate 23, which is there located, down upon the under presser block or plate 24. The latter is supported in a substantially horizontal position on four springs 25, one at each corner, and when these yield from the position seen in Figures 1 and 2, it rests firmly on the base 26 in the position seen in Figure 3. These springs are stiff enough to require exertion of a moderate pressure between the blocks before the under one yields. In yielding, the latter may be guided, as illustrated, on rods 27 on which the spiral springs 25 are wound. Co-operating with these springs is a single and powerful spring 30 at the other end of the lever 20, inserted between the cam roller 22 and the lever 20, as seen in Figure 10. The cam 19 is shaped with a quick rise followed by a rest at that elevation and then gradual further rise, followed by quick descent to initial point. When it begins to turn from the position illustrated in Figure 1, it quickly lifts the cam roller 22. As the spring 30 remains unyielding, the lever swings the upper presser block 23 downward toward the lower plate 24, engages anything that may be thereon, such as an upper 28 with a sheet of composition assembled in it, and depresses it a little, enough to make sure that pressure equal to the tension of the springs 25 is experienced. The rest, produced by the semi-circular right-hand half of the cam as represented in Figure 1 occurs here. Resumption of the rise of the cam slowly carries the under block down, through perhaps a fourth of a revolution, until it rests against the firm base support 26, after which the continuation of rise results in yielding of the material which is between the two blocks, or else in yielding of the powerful spring 30. The limit of pressure on the material may be adjusted and predetermined by the screw setting of the plug 31 which backs the spring and cam roller 22 and is held by lock nuts 32. It is at this stage that the composition is forced into the interfibrous spaces, having been preliminarily softened and rendered plastic by heat supplied from a heating unit within the presser block 23, while the material is subjected to the moderate pressure applied by springs 25. Upon the ensuing fall of the cam, at which the spring 20' draws down the cam roller, all is released and the blocks return to the position illustrated in Figure 1.

For material that requires heat treatment suitable thermostatic heat controlling means may be provided within the block 23 so that heat is supplied at the correct rate to produce the precise degree of softness needed, during each cycle of operations of the presser blocks. It is important both that there be no repetition of such a cycle with the same stock in the press and that heat inflow be stopped at the proper instant, as otherwise the material would be overheated with undesirable results. The invention, therefore provides for the operating mechanism to be started easily by the operator, and to be stopped automatically, with the presser blocks separated, after application of the predetermined pressures and temperature for a predetermined number of seconds. Important parts which co-operate with others to produce this are the spring 15, which when released closes the clutch to start the machine and the cam pin 45 on the main gear 17 which opens the clutch.

The clutch control device comprises the fork 14, the rod 44 extending therefrom and the horizontally swinging lever 46, pivoted at 47 at the rear on a plate 10' fixed on the base, which lever when set outward holds the rod 44, fork 14, and clutch member 13 open so that the power is disconnected. This opening is accomplished when the cam pin 45 on the large gear 17 strikes the cam surface 48' on an auxiliary lever 48 which overlies the lever 46, is fulcrumed on the same pivot 47 with it, and acts as if integral with it, for the instant illustrated in Figure 5ª because of the latch 49 which connects these two. This latch, as illustrated, has the aspect of a detent pivoted on the lever 46 at 49', resting thereon in the same plane with the lever 48, and normally set so that, when the cam pin 45 in its travel reaches the cam surface 48' and drives the lever 48 outward, the lever 46 is also pushed outward through the latch connection and pulls the rod 44 and clutch 13, cutting off the power; and the pin 45 is so set that this occurs when the roll 22 is at the bottom of the depression of the cam 19. With the power thus cut off, and with the springs 15 and 20' and the momentum of the heavy lever 20 opposing further motion, the latter having to reverse its motion after a quick swing, the parts come to rest before the pin 45 has passed the cam 48'. Thus they remain with the clutch 13 held open by the cam pin 45, which in turn is held still because the spring 20' maintains the cam 19 stationary by holding the cam roller 22 in the narrow trough whence it cannot move without rising against the spring 20'. Operation is resumed when the operator pushes the button 50, conveniently located on the end of a spring-held rod, ready when pushed to swing the detent 49 away from the lever 48, so that even though the lever 48 remains engaged by the cam pin 45, the lever 46 is free of it and can swing inward, which it immediately does under the power of the clutch spring 15. The clutch is thereupon engaged and the gear 17 turned, the cam pin 45 passing beyond the cam surface 48', and allowing the lever 48 to be swung inward by the cam action of the latch 49, as it is reset by the spring 50' pushing on the button 50. At the completion of the cycle of operations, the cam pin again strikes the cam surface on the lever 46, causing automatic stopping of the machine.

Assuming it is desired to introduce a sheet of composition, which is hard and stiff when cold, but becomes plastic when heated, into the interfibrous spaces of a sheet or plurality of sheets of cloth, as is done in the process of making box toes for shoes, the machine may be timed to make a complete revolution of the cam 19 in say twenty seconds, to apply heat for approximately fifteen seconds at a moderate pressure of the springs 25 for the pre-heating and the producing of a soft but not fluid state, and then to continue the inflow of heat at high pressure during five seconds more, during which time the flux of composition into the cloth occurs, and the resulting combination is molded into whatever shape is provided for by the positioning and form of the pressure block faces. The machine must then stop and leave the material safe from the heat. All of this the machine does. The pressure is controlled by the cam 19 and relative action of springs 25 and 30. The intensity of heat is controlled by suitable thermostat means, not shown; the length of time during which the heat is applied is controlled by the cam 19, speed of the machine being taken into account; and the automatic cessation of operation comes with the engagement of the cam pin 45, and the surface 48' on the auxiliary lever 48, with the resulting disengagement of the clutch and its maintenance in inoperative position, while the material rests on the unheated or merely warm lower plate to await removal.

Meanwhile, all that the operator does is to insert the upper and press the button 50.

Under these circumstances, an operator can work four machines, placing an upper in each of them in turn and pushing its button. For this, five seconds is ample time; and by the time the fourth is completed, the first has done its work and is ready again.

I claim as my invention:

1. The combination with apparatus to be driven, having a rotating element which in an aliquot part of its complete revolution controls a complete cycle of operations of the apparatus, of a self closing clutch having a movable clutch member; actuating means on the element; and opening mechanism intervening between said actuating means and the clutch, comprising a pair of levers pivoted on a common axis, one of said levers being attached to the movable clutch member, and the second of said levers being engaged by said actuating means; a latch adapted to engage between the first and second levers, so that when the latch is engaged both said levers may be swung about the common axis to open the clutch; said actuating means being arranged to move said second lever in a direction to open the clutch, whereby the mechanism stops with the clutch held open; said latch being adapted to be dislodged manually thereby to disconnect the two levers.

2. The combination, with apparatus to be driven, having a rotating element which in an aliquot part of its complete revolution controls a complete cycle of operations of the apparatus, of a self closing clutch; a lever adapted to open it; a second lever superimposed above the first and adapted to move in a direction to swing the first lever for opening the clutch; a latch on one of these levers swinging in the plane of the other, and means whereby said latch automatically assumes a position to engage the other lever; and means on the said element to actuate the second lever at each cycle, thereby actuating the first lever and opening the clutch; the whole being arranged for the said latch to be manually released, thereby disconnecting the said levers and permitting the clutch to close.

3. The combination, with apparatus to be driven, having a rotating element which in an aliquot part of its complete revolution controls a complete cycle of operations of the apparatus, of a self closing clutch making connection with driving means; actuating means on the element; a pair of cooperating levers movable in parallel planes about a common axis, one of which is connected to said clutch to open it and the other of which is adapted to be engaged by said actuating means; and a latch pivotally mounted on one of said levers and movable in the plane of the other to engage it, thereby connecting said levers so that movement of one by said actuating means simultaneously swings the other about the common axis to open the clutch.

4. The combination, with apparatus to be driven, having a rotating element which in an aliquot part of its complete revolution controls a complete cycle of operations of the apparatus; a spring closed clutch making connection with driving means; actuating means on said element; a pair of cooperating levers mounted upon a common axis, one of which is connected to said clutch to open it and the other of which is adapted to be engaged by said actuating means; and a latch normally connecting said levers so that actuation of one by said actuating means is transmitted to the other to open the clutch; there being a cam contact between said actuating means and its lever whereby upon initial movement of the lever opening the clutch the said actuating means, levers and latch come to rest in engagement, restrained by the clutch spring; and upon release of the latch said actuating means moves past engagement with its lever permitting the lever to swing free.

5. The combination with apparatus to be driven, having a rotating element which in an aliquot part of its complete revolution controls a complete cycle of operations of the apparatus, of a self closing clutch having a movable clutch member; actuating means on the element; and opening mechanism intervening between said actuating means and the clutch, comprising a pair of levers movable in parallel planes about a common axis, one of said levers being attached to the movable clutch member and the second of said levers being adapted to be engaged by said actuating means; a latch pivotally mounted on the clutch lever and movable in the plane of the second lever to engage it, whereby the levers swing together when the second lever is moved by the actuating means; means adapted to swing said latch out of engagement with said second lever whereby said clutch lever swings free to permit closing of the clutch; and spring means adapted to swing the latch upon its pivot to reengage the second lever and to position said second lever for engagement by said actuating means.

Signed at Boston, Massachusetts, this nineteenth day of January, 1923.

JOSEPH H. ORDWAY.

Certificate of Correction.

It is hereby certified that Letters Patent No. 1,556,874, granted October 13, 1925, upon the application of Joseph H. Ordway, of Brookline, Massachusetts, for an improvement in "Clutch Mechanisms," were erroneously issued to "United Shoe Machinery Corporation, of Paterson, New Jersey, a Corporation of New Jersey," whereas said Letters Patent should have been issued to *Yawdro Manufacturing Company, of Cambridge, Massachusetts, a Corporation of Massachusetts.* said corporation being assignee of the entire interest in said invention, as shown by the records of assignments in this office; and that the said Letters Patent should be read with this correction therein that the same may conform to the record of the case in the Patent Office.

Signed and sealed this 17th day of November, A. D. 1925.

[SEAL.]
WM. A. KINNAN,
*Acting Commissioner of Patents.*